(12) United States Patent
Dortch et al.

(10) Patent No.: US 12,149,834 B1
(45) Date of Patent: Nov. 19, 2024

(54) SYSTEM AND METHOD FOR OPTIMIZING EXPOSURE OF VIDEO FEEDS USING ALTERNATING EXPOSURES

(71) Applicant: UIPCO, LLC, San Antonio, TX (US)

(72) Inventors: Celena Dortch, San Antonio, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 99 days.

(21) Appl. No.: 17/936,407

(22) Filed: Sep. 29, 2022

Related U.S. Application Data

(60) Provisional application No. 63/250,275, filed on Sep. 30, 2021.

(51) Int. Cl.
*H04N 23/73* (2023.01)
*H04N 23/743* (2023.01)

(52) U.S. Cl.
CPC .......... *H04N 23/73* (2023.01); *H04N 23/743* (2023.01)

(58) Field of Classification Search
CPC ............................. H04N 23/73; H04N 23/743
See application file for complete search history.

(56) References Cited

U.S. PATENT DOCUMENTS

| | | | | |
|---|---|---|---|---|
| 10,015,442 | B1 * | 7/2018 | Maltezos | H04N 7/147 |
| 10,148,893 | B2 * | 12/2018 | Gupta | H04N 23/72 |
| 10,382,691 | B2 * | 8/2019 | Jung | G06T 7/11 |
| 2021/0235017 | A1 * | 7/2021 | Naito | H04N 23/951 |

* cited by examiner

*Primary Examiner* — Ahmed A Berhan
(74) *Attorney, Agent, or Firm* — Plumsea Law Group, LLC

(57) ABSTRACT

A system and method for optimizing the exposure of a video feed is disclosed. The method includes controlling a camera to capture a video feed with alternating exposures for each video frame. Groups of alternating exposures are then merged to create composite images that are used to create a modified video feed.

20 Claims, 11 Drawing Sheets

| Normal Camera Frame Rate (frames/second) | Modified Camera Frame Rate | Output Video Frame Rate (frames/second) |
|---|---|---|
| 30 | 90 | 30 |
| 60 | 180 | 60 |
| 120 | 360 | 120 |

FIG. 11

SYSTEM AND METHOD FOR OPTIMIZING EXPOSURE OF VIDEO FEEDS USING ALTERNATING EXPOSURES

CROSS-REFERENCE TO RELATED APPLICATIONS

This application claims the benefit of Provisional Patent Application No. 63/250,275 filed Sep. 30, 2021, and titled "System and Method for Optimizing Exposure of Video Feeds Using Alternative Exposures," which is incorporated by reference herein in its entirety.

TECHNICAL FIELD

The present disclosure generally relates to video, and in particular to optimizing lighting qualities of a video.

BACKGROUND

Consumers are coming to rely on using cameras (and specifically, so-called "webcams"), to stream video during video calls for both remote work and personal social interactions. Most inexpensive cameras, including webcams, which may be used for remote work and other video calls aren't well calibrated to produce the best exposure for some user complexions. This can result in video feeds that are overexposed, or underexposed, especially with respect to the caller's face. In the context of remote work, or video conferencing, this can lead to differences in the image quality of video feeds for users with different complexions. This can cause frustration for user's whose video feeds are not properly exposed. In the context of remote work, such discrepancies in image quality can have a negative impact on a particular employee's ability to communicate while on video calls.

There is a need in the art for a system and method that addresses the shortcomings discussed above.

SUMMARY

In one aspect, a method of improving the exposure of video feeds includes steps of receiving a video feed from a camera, where the camera is in communication with a camera settings controller, and where the camera settings controller can be used to adjust camera settings of the camera, sending a first command to the camera settings controller to adjust the camera settings to a first set of values associated with a first exposure, capturing a first image from the ongoing video feed while the camera settings have the first set of values, sending a second command to the camera settings controller to adjust the camera settings to a second set of values that is different than the first set of values, where the second set of values are associated with a second exposure that is different from the first exposure, capturing a second image from the ongoing video feed while the camera settings have the second set of values, sending a third command to the camera settings controller to adjust the camera settings to a third set of values that is different than the first set of values and that is different than the second set of values, where the third set of values are associated with a third exposure that is different from the first exposure and from the second exposure, and capturing a third image from the ongoing video feed while the camera settings have the third set of values. The method also includes steps of processing, using an anti-jitter module, the first image to produce a first processed image, processing, using the anti-jitter module, the second image to produce a second processed image, processing, using the anti-jitter module, the third image to produce a third processed image, and processing, using an exposure bracketing module, the first image, the second image, and the third image, to produce an output image, where the output image includes information from the first image, the second image, and the third image, and creating a modified video feed using at least the output image.

In another aspect, a method of improving the exposure of video feeds includes steps of receiving a video feed having a first frame rate from a camera, where the camera is in communication with a camera settings controller, and where the camera settings controller can be used to adjust an exposure setting of the camera, communicating with the camera settings controller to generate a first sequence images, where each of the images in the first sequence of images has a different exposure, processing the first sequence of images to create a first output image comprising information from each image in the first sequence of images, communicating with the camera settings controller to generate a second sequence of images, where each image in the second sequence of images has a different exposure, processing the second sequence of images to create a second output image comprising information from each image in the second sequence of images; and generating a modified video feed using the first output image and the second output image, where the modified video feed has a second frame rate that is less than the first frame rate.

In another aspect, a system for improving the exposure of video feeds includes a processor and machine-readable media including instructions which, when executed by the processor, cause the processor to receive a video feed having a first frame rate from a camera, where the camera is in communication with a camera settings controller, and where the camera settings controller can be used to adjust an exposure setting of the camera. The instructions further cause the processor to communicate with the camera settings controller to generate a first sequence images, where each of the images in the first sequence of images has a different exposure, process the first sequence of images to create a first output image comprising information from each image in the first sequence of images; communicate with the camera settings controller to generate a second sequence of images, where each image in the second sequence of images has a different exposure; process the second sequence of images to create a second output image comprising information from each image of the second sequence of images, and create a modified video feed using the first output image and the second output image, where the modified video feed has a second frame rate that is less than the first frame rate.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 11 is a schematic view of a table of frame rates, according to an embodiment.

DESCRIPTION OF EMBODIMENTS

Figure 1:
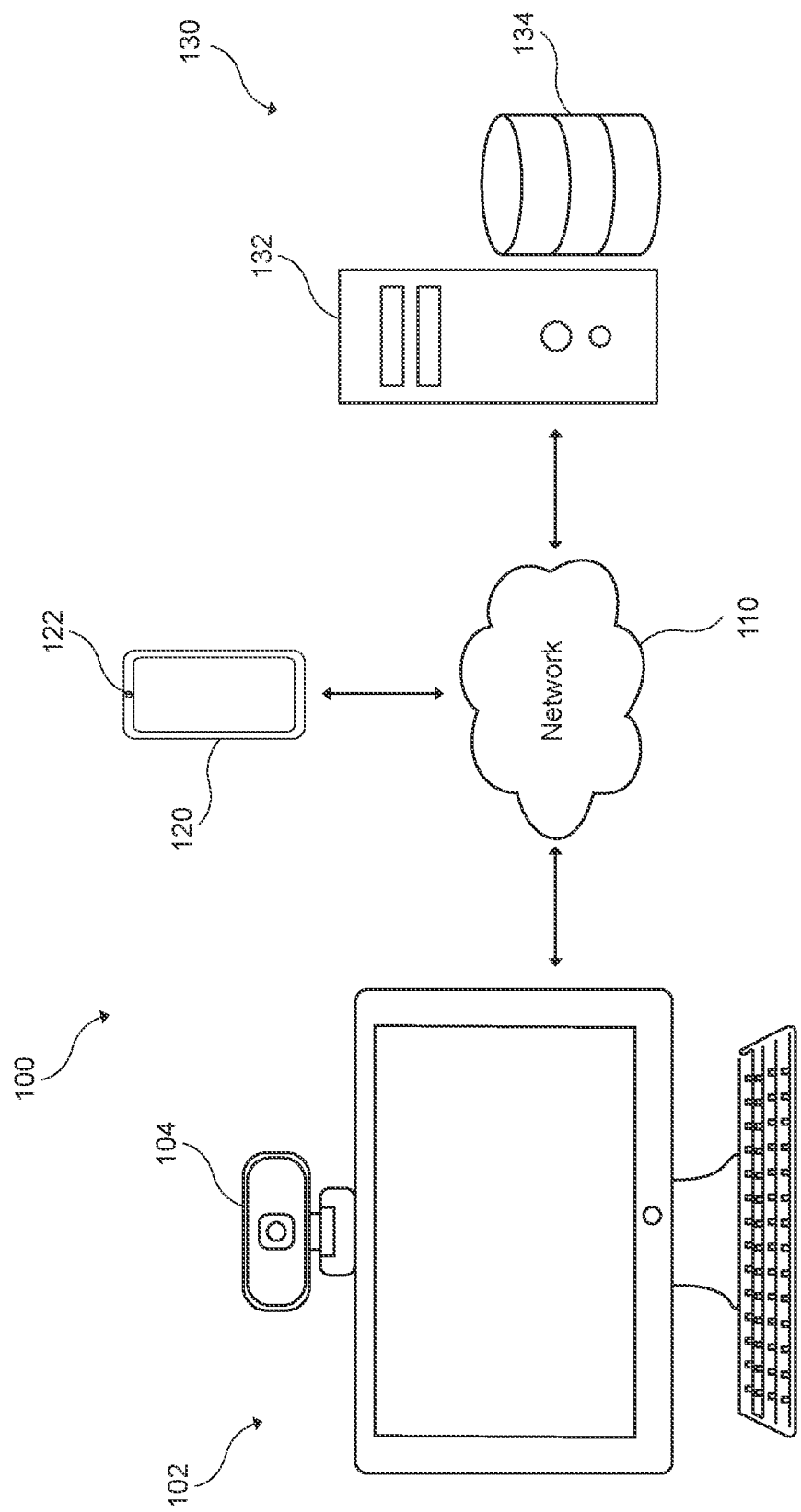
FIG. 1 is a schematic view of an arrangement of networked computer systems, according to an embodiment.

The embodiments provide systems and methods for improving the image quality of video feeds produced by inexpensive video devices (such as webcams). In particular, the embodiments provide systems and methods that can optimize the exposure of a video feed produced by a webcam or other video camera. The method includes sending commands to a camera controller to produce a video feed in which the images (or frames) having alternating exposures. The video feed with alternating exposures is then processed, such that sequences of images with alternating exposures are merged into a single composite image. To reduce issues related to the motion of objects between subsequent frames, the embodiments apply anti-jittering algorithms to each image.

In order to limit lag and additional processing power, some embodiments employ an S-shaped exposure pattern, in which the camera's exposure is ramped up and down between minimum and maximum values, such that two sequential images are always taken at the maximum and minimum exposures.

All of these embodiments help solve the problem of exposure variability (and more broadly of image quality variability) among user's having different complexions.

The embodiments describe digital cameras that may have one or more camera settings. Exemplary camera settings include, but are not limited to: shutter-speed, aperture, and ISO. The shutter-speed characterizes how quickly the camera shutter opens and closes, and thus the duration of time over which light can pass to the camera sensor. The aperture characterizes the size of the opening that the light passes through (when the shutter is open). The ISO setting of a digital camera controls how sensitive the camera's sensor is to light.

As used herein, the term "exposure" refers to the amount of light reaching a (digital) camera's sensor. Exposure varies according to (at least) the camera settings for aperture, shutter-speed, and ISO. One metric for evaluating the exposure for a given set of camera settings is known as the "Exposure Value," or simply "EV". The EV is a single number and can be calculated as a function of the aperture, shutter-speed, and ISO values. Moreover, there may be different sets of values (that is, values of shutter-speed, aperture, and ISO) that evaluate to the same exposure value. Each incremental increase of the exposure value (for example, 1, 2, 3) results in a doubling of the amount of light received at the camera's sensor. Each incremental decrease (for example, 2, 1, 0, −1) results in a halving of the amount of light received at the camera's sensor.

In some embodiments, a digital camera may have an exposure compensation setting, also referred to as an exposure control setting. That is, a user can set the value of the exposure compensation setting (or exposure control setting) in order to increase or decrease the exposure value. In such cases, the system may automatically select a set of shutter-speed, aperture, and ISO values to arrive at the desired exposure value. Alternatively, some digital cameras may require independent adjustments to shutter-speed, aperture, and ISO values to adjust the exposure value.

As used herein, the term "exposure setting" includes any camera settings that affect the exposure. Exposure settings include aperture, shutter-speed, ISO, as well as exposure compensation (or exposure control) settings.

The embodiments describe systems and methods for automatically processing video feeds. A video feed may comprise a sequence of images, also referred to as video frames. The number of images displayed per second when the video is played is referred to as the frame rate.

FIG. 1 is a schematic view of a configuration 100 of networked computer systems that may be used to facilitate various user interactions, including video calls. The term "computer system" refers to the computing resources of a single computer, the partial computing resources of a single computer, a plurality of computers communicating with one another, or a network of remote servers. In the exemplary embodiment, a first computer system 102 is networked, via network 110, to a second computer system 120. In particular, using suitable software operating on first computer system 102 and second computer system 120, users of the computer systems can communicate using audio and video calling.

Second computer system 120 may be a mobile phone configured with processors and memory. Second computer system 120 may also include a front-facing camera 122 that can record video of a user, for example, during a video call.

The embodiments also show an exemplary third computer system 130. Third computing system 130 may comprise a backend system that supports applications operating in first computer system 102 and/or second computer system 120. In the embodiment of FIG. 1, computer system 130 includes one or more computing devices 132 (for example, servers) that may be in communication with one or more databases 134. Databases 134 could be co-located with computing devices 132 or could be remote databases that are accessible by computing devices 132 over a network, including network 110. Databases 134 can include any kind of storage devices, including but not limited magnetic, optical, magneto-optical, and/or memory, including volatile memory and non-volatile memory.

A computer system interfacing directly with users, such as computer system 102, could operate in a client-server relationship with one or more servers of third computer system 130. For example, computer system 130 may include a server that communicates with first computer system 102 over network 110. First computer system 102 may provide the front-end of a system that facilitates interactions between users. For example, in one embodiment, first computer system 102 may be configured to run software through a web browser, in which the client software, as well as user information and data may be hosted on a server of third computer system 130. In other cases, first computer system 102 may run client software in the form of a native software application. In some cases, while the client software that allows users to perform various tasks may be run on first computer system 102, the data may be retrieved from and stored on databases associated with third computer system 130.

To facilitate interactions between users, each of computer system 102 and computer system 120 may include components to facilitate communication with external systems (for example, hardware and software components to enable communication over network 110). Each computer system may generally include a processor, a data storage component and a display. Each computer system may further include one or more input devices. These could include a keyboard, mouse, or one or more physical buttons integrated into a case of the device. In some cases, a computer system includes touchscreen controls.

To enable video calls, each computer system could include a digital camera that is connected to the computer system. In the embodiment of FIG. 1, for example, computer system 102 includes a webcam 104. In the exemplary embodiment, webcam 104 is configured to attach (for example, clip) to display 103 of computer system 102. In other embodiments, webcam 104 could be integrated directly into display 103. In still other embodiments, a webcam could be a standalone camera. Moreover, the embodiments are not limited to using cameras that are configured specifically as webcams, and in other embodiments any suitable camera capable of capturing video can be used. For example, computer system 120, taking the form of a mobile phone, includes a camera 122.

It may be appreciated that the principles and ideas described herein could be applied to a variety of different applications. More generally, the principles and ideas described herein could be useful in any application where two or more users are participating in a video call.

Other embodiments can use any suitable computer systems, such as laptops, tablet computers, smart phones, or other suitable computer systems.

As already discussed, the embodiments provide systems and methods for improving the appearance of one or more users on a video call. More specifically, the embodiments provide systems and methods that can automatically adjust the exposure of a video feed. In some contexts, this could be used to ensure that users with darker complexions are shown with an optimal exposure.

Figure 2:
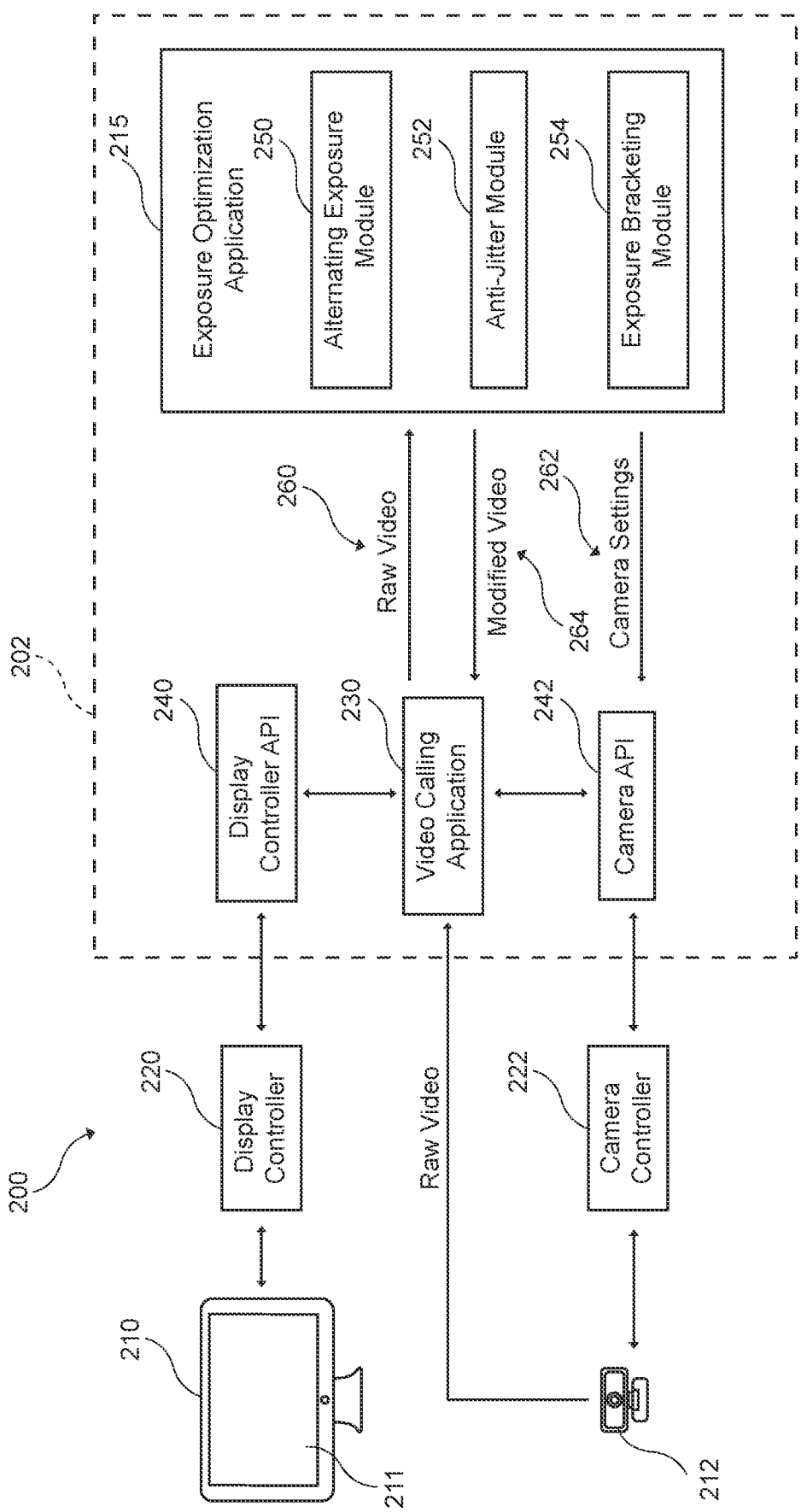
FIG. 2 is a schematic view of an architecture for a system that can be used to optimize the exposure of a face within a video feed, according to an embodiment.

FIG. 2 is a schematic view of an architecture 200 that facilitates optimizing the exposure of a video feed for different users, each of which may have different complexions.

In FIG. 2, a system 202 may include various components, including applications, modules, and APIs for receiving, processing, and sending information to external components. In this example, the external components include a display 210 and a webcam 212. In one embodiment, system 202 could comprise a single computer system. In other cases, some of the applications, modules, and APIs could be performed by two or more computer systems that may be networked together.

Each of the external devices connected to system 202 could include associated controllers. As user herein, the term "controller" refers to any combination of hardware and/or software that can be used to control one or more features of a device. In some cases, controllers could comprise drivers for a device.

In FIG. 2, display 210 is associated with a display controller 220, which includes various functionality for displaying data generated by system 202 as visual information (such as text and images) on the screen 211 of display 210. Webcam 212 is associated with a camera controller 222, which includes various functionality for controlling aspects of webcam 212. In particular, camera controller 222 may be used to change the settings of webcam 212, which could include an aperture setting, a shutter speed setting, and an ISO setting, as well as other suitable settings that are described in further detail below.

In some embodiments, a device controller can be disposed within a centralized computer system, such as system 202. In other embodiments, a device controller could be integrated into the corresponding device. For example, a camera controller could be integrated into a webcam. Moreover, in a given embodiment some device controllers may be disposed in a centralized computing device, while other device controllers could be integrated directly into the controlled devices. In still other embodiments, a device controller could be disposed within an intermediate system that is independent of the device and the computer system running various applications that rely on controlling the device.

Each device controller may be configured to communicate with an associated API of system 202. In the exemplary embodiment, system 202 uses a display controller API 240 (or simply "display API 240") to communicate with display controller 220. Additionally, system 202 uses a camera controller API 242 ("camera API 242") to communicate with camera controller 222. Using the appropriate APIs, the applications and/or modules of system 202 may receive information from the device controllers, and/or send commands to the device controllers. In some cases, the various APIs shown in FIG. 2 could be replaced directly with device controllers, and corresponding APIs could be integrated into various applications running on system 202.

System 202 may further include a video calling application 230 that facilitates video calling between two or more users. Video calling application 230 could use any suitable software or protocol. Video calling application 230 may receive raw video directly from webcam 212. As used herein, the term "raw video" refers to video data as it is generated by a camera. In particular, raw video has not been processed by any software operating externally to the camera.

After processing raw video, video calling application 230 may pass the output video data to display controller API 240, so that the video data can be viewed by a user at display 210. In some embodiments, video calling application 230 may also communicate directly with camera API 242.

To help achieve optimal exposures for different users, system 202 may also include an exposure optimization application 215 ("optimization app 215"). In some cases, optimization app 215 could be integrated directly into video calling application 230 (or vice versa). However, in some embodiments, optimization app 215 can be a stand-alone application that communicates with video calling application 230 using any suitable application programming interfaces ("APIs").

Optimization app 215 may include various modules for facilitating processing of video data. These include an alternating exposure module 250, an anti-jitter module 252, and an exposure bracketing module 254.

Alternating exposure module 250 automatically adjusts camera settings of webcam 212, via commands sent to camera controller 222, to generate alternating exposures for each images (or frames) as they are captured by webcam 212 in real time.

Anti-jitter module 252 automatically processes batches of images (or frames) from a video feed and applies anti-jitter (or de-jittering) algorithms to the images. Any suitable anti-jitter algorithms known in the art could be used.

Exposure bracketing module 254 can be used to combine multiple images (or frames of video) into a single image. Specifically, exposure bracketing module 254 combines images having different exposures to create a final image that is optimally exposed across the entire image and/or at selected regions (such as a face).

In operation, raw video 260 from webcam 212 is fed into video calling application 230, which outputs at least some of the video information to the display via the display API 240. When optimization app 215 is being used, video calling application 230 may also feed some or all of the raw video data ("raw video 260") to optimization app 215.

Optimization app 215 processes the raw video data, using one or more of the modules described above. Based on this processing, optimization app 215 may generate various commands to change the settings of one or more external devices. For example, optimization app 215 can generate camera settings 262 and deliver those settings to camera API 242. As discussed in further detail below, optimization app 215 can send commands to camera API 242 to have webcam 212 take images with alternating exposures.

After processing raw video 260, optimization app 215 can generate modified video 264, which may be passed back to video calling application 230.

It may be appreciated that the present architecture could be deployed at any computer system participating in a video call.

Figure 3:
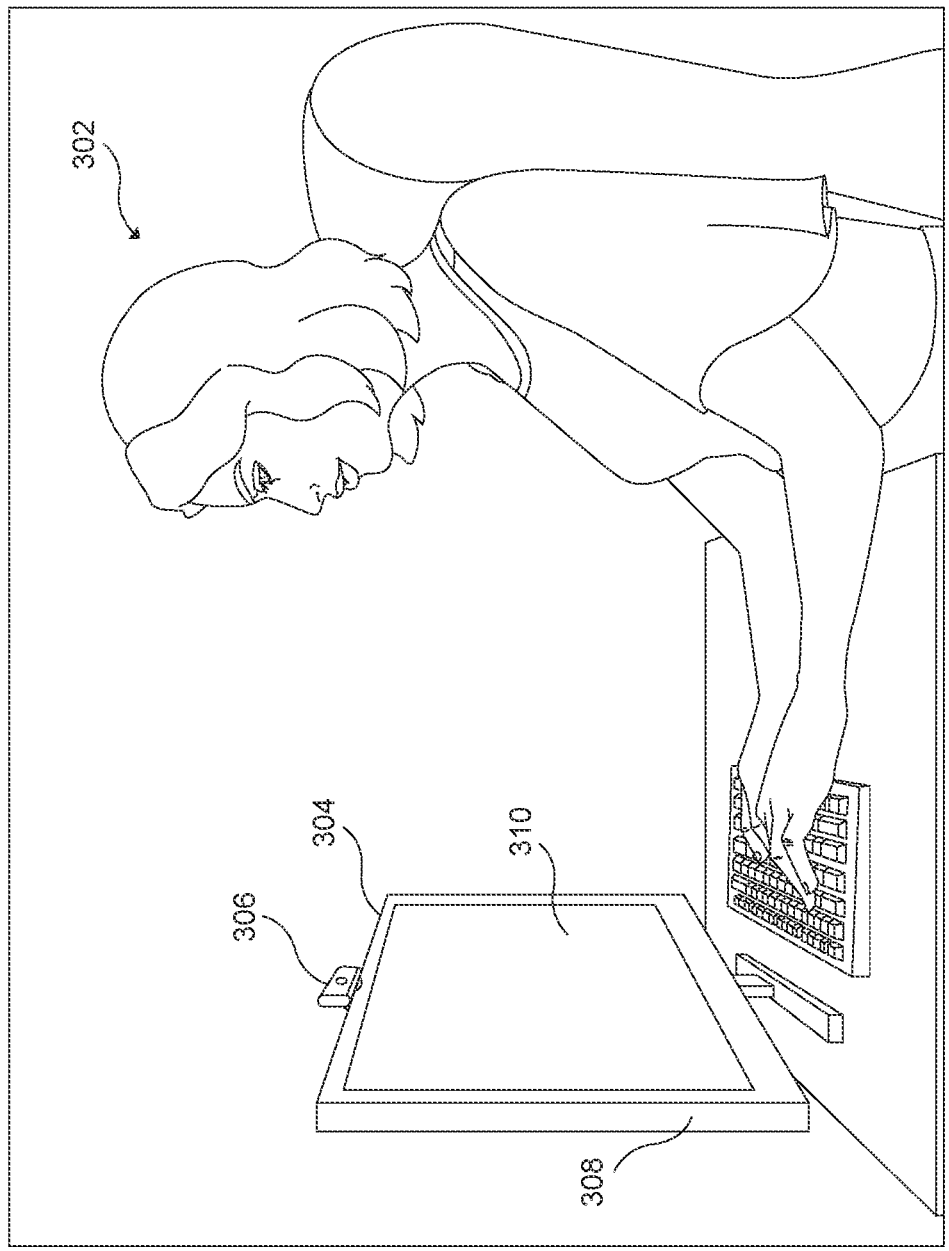
FIG. 3 is a schematic view of an exemplary configuration in which a user has a computer system with a webcam, according to an embodiment.

FIG. 3 is a schematic view of an exemplary scenario in which a user 302 is interacting with another user (not shown) through a video calling application running on computer system 304. In this exemplary scenario, user 302 could be a customer service agent or representative on a video call with a customer. The embodiment of FIG. 3 includes a webcam 306 connected to computer system 304. Computer system 304 also includes a display 308 with a display screen 310.

Figure 4:
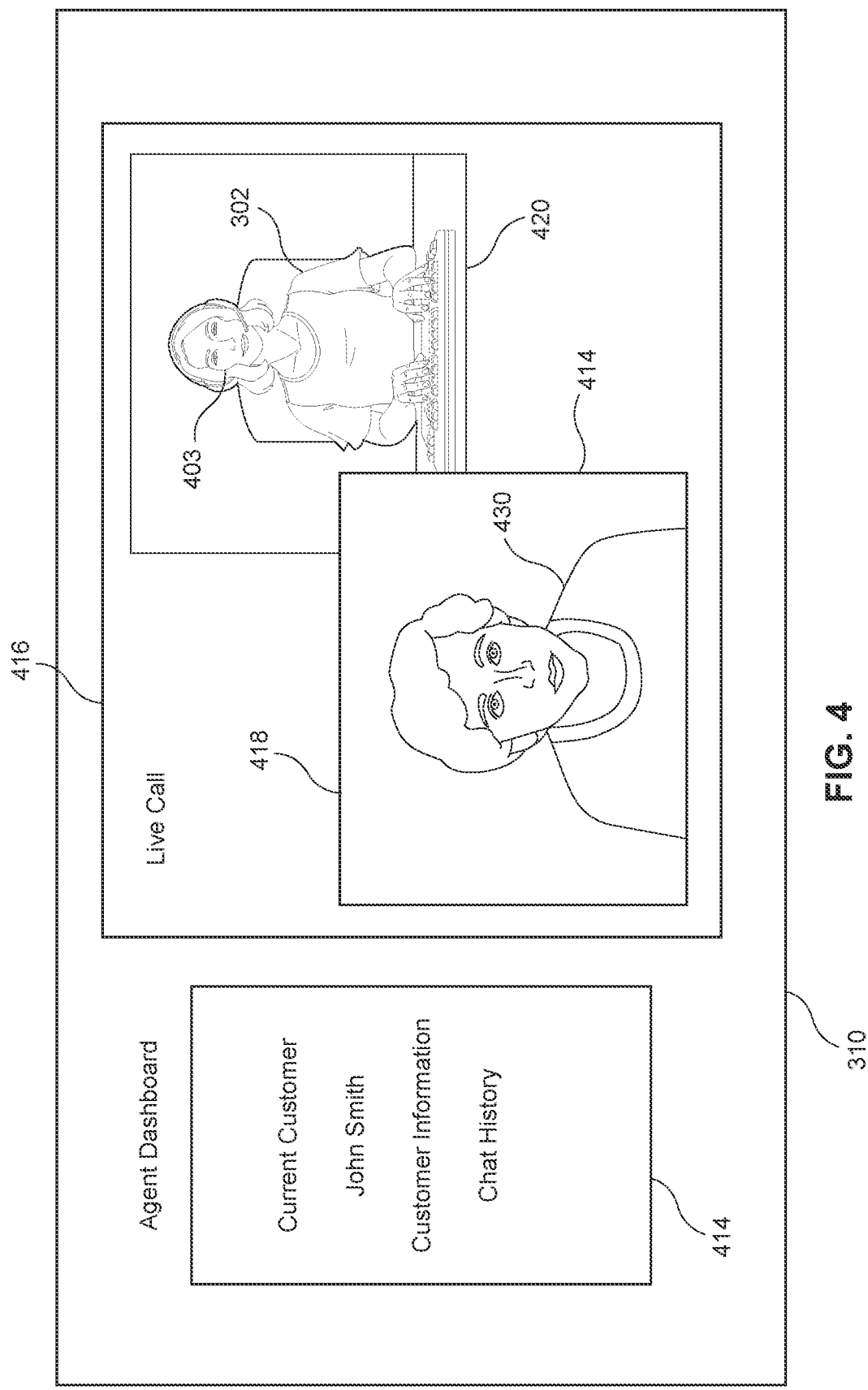
FIG. 4 is a schematic view of a dashboard UI for a user that includes video feeds of an ongoing video call, according to an embodiment.

FIG. 4 is a schematic view of the content displayed on display screen 310, which is visible to user 302. Specifically, display screen 310 shows an agent dashboard application, which further includes a customer window 414 and a live call window 416. Within live call window 416, user 302 can see a first video feed 418 showing a customer 430. In addition, live call window 416 may show a second video feed 420 of user 302.

Using conventional webcam technology, users with darker complexions may face problems with exposure in the video feed showing the user. For example, in FIG. 4, second video feed 420 may be poorly exposed, so that it is difficult to make out features of face 403 of user 302. This may happen because the default settings on webcam 306 are not optimized to create an exposure for video feed 420 that accurately renders face 403 with respect to contrast, brightness, temperature color, or other suitable image characteristics.

In order to modify the exposure of second video feed 420, the embodiments provide systems and methods for capturing images with different exposures and automatically combining, or merging, images with different exposures to create an image that is optimally exposed. In some embodiments, the method includes increasing the frame rate of the incoming video feed, so that the processed video feed, in which two or more images are combined, has a frame rate that matches the original recording frame rate.

Figure 5:
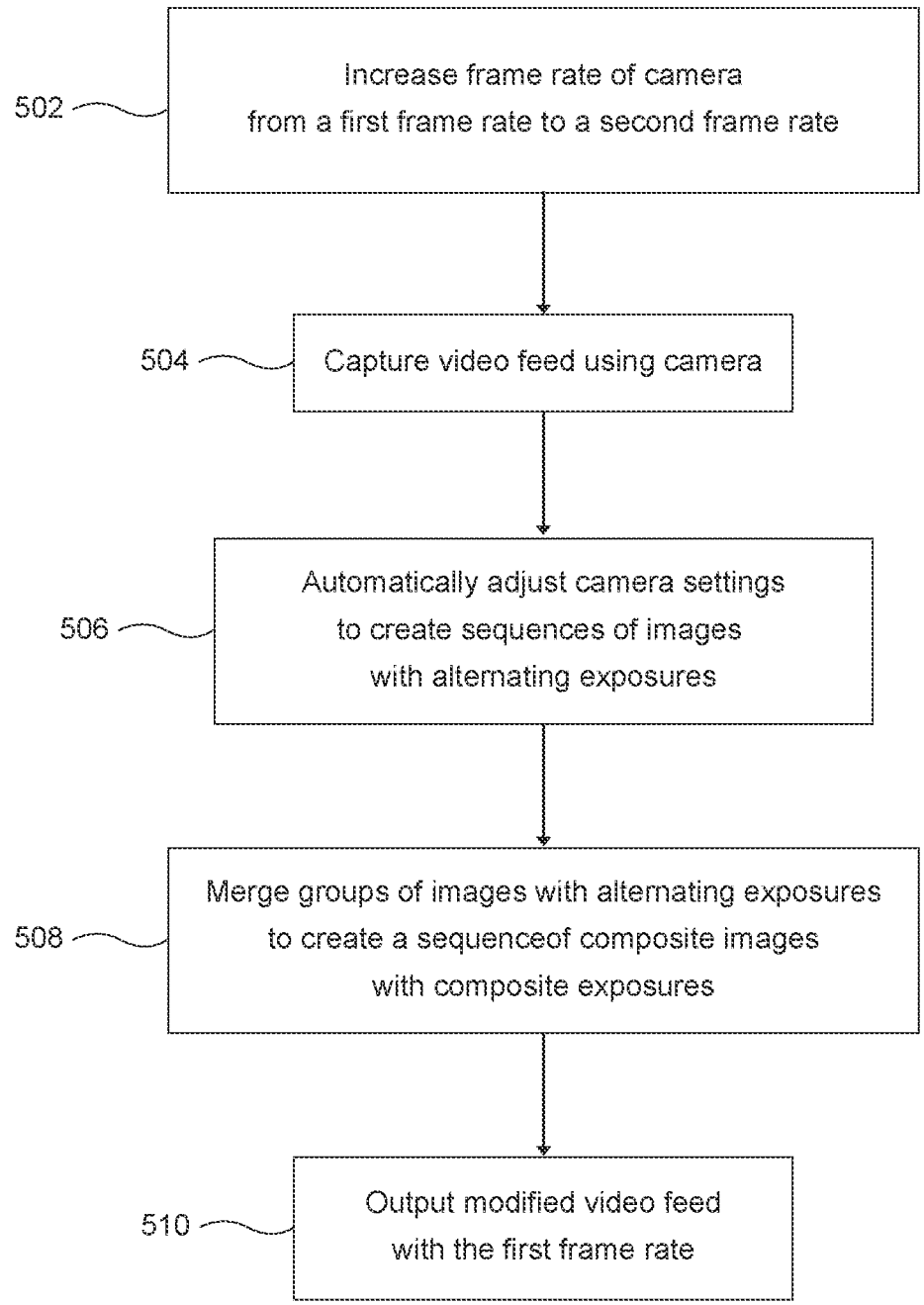
FIG. 5 is a schematic view of a process for generating a modified video feed, according to an embodiment.

FIG. 5 is a schematic view of a process for modifying a video feed according to an embodiment, in order to achieve an optimal image exposure for the modified video. It may be appreciated that one or more of the following systems could be performed by any suitable system running an exposure optimization algorithm, such as system 202 described above and shown in FIG. 2.

Starting in step 502, system 202 may increase a frame rate of a camera from a first frame rate to a second frame rate. In some cases, system 202 sends commands to the camera to change the frame rate from the first frame rate to the second frame rate.

The second frame rate may generally be larger than the first frame rate. In some cases, the second frame rate may be at least twice the first frame rate. In other cases, the second frame rate may be three times the first frame rate. For example, if a camera typically captures video with a frame rate of 30 frames per second for video calls, the exemplary system may send commands to the camera to capture video at 90 frames per second. The increased frame rate provides the system with three times as many images (or frames) as needed for the video calling application. In still other cases, the second frame rate could be any suitable multiple of the first frame rate.

In step 504, system 202 may capture a video feed using a camera. The captured video feed may have a frame rate equal to the second frame rate (for example, 90 frames per second).

In step 506, system 202 may automatically adjust camera settings of the camera to create a sequence of images (or frames) with alternating exposures. As an example, the system could send commands to the camera controller to change the exposure between at least three different exposure settings. In some cases, system 202 could send commands to change an exposure compensation setting, or, equivalently, send a command indicating a desired exposure value. In that case, a camera may automatically adjust the shutter-speed, aperture, and ISO settings to achieve the desired exposure value. However, in other cases, system 202 may send commands indicating particular values of shutter-speed, aperture, and ISO that system 202 has determined will result in the desired change in exposure.

In step 508, system 202 may merge groups (or sequences) of images with alternating exposures to create a sequence of composite images. The exposures of the individual images merged to create the composite images may contribute to the resulting exposures of the composite images.

In step 510, a sequence of composite images are collected into a modified video feed that has the first frame rate. A detailed overview of this process is described below.

Figure 6:
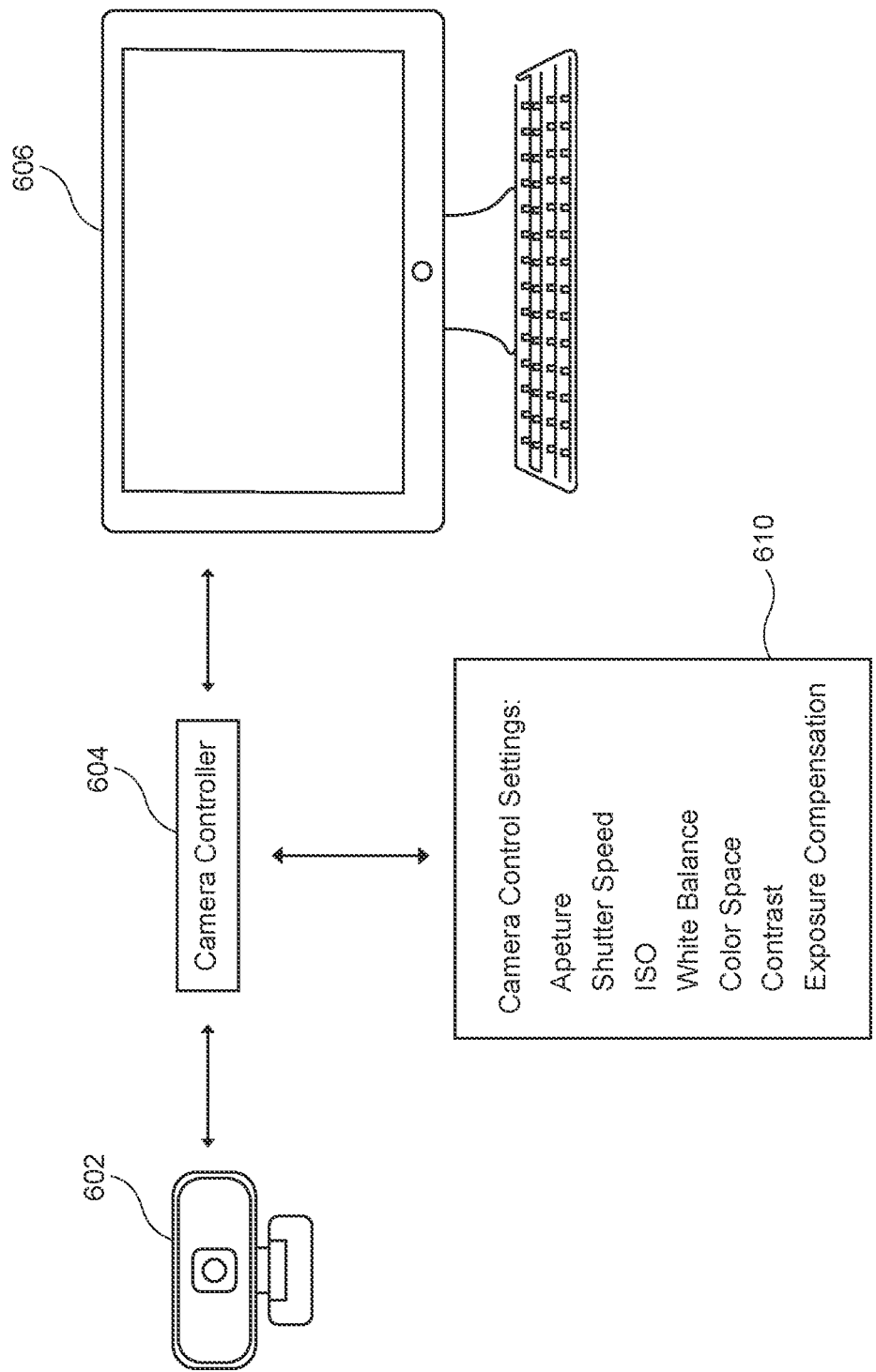
FIG. 6 is a schematic view of a system having a webcam with adjustable camera control settings, according to an embodiment.

FIG. 6 is a schematic view showing various camera settings for a camera 602 that can be adjusted by an application running on a computing device 606 using a camera controller 604. These camera control settings 610 include, but are not limited to "Aperture", "Shutter Speed,"

"ISO," "White Balance," "Color Space," "Contrast," and "Exposure Compensation." It may be appreciated that different digital cameras could provide different customizable settings. As previously discussed, cameras providing exposure compensation settings may automatically adjust aperture, shutter-speed, and ISO settings to achieve a selected exposure value.

Figure 7:
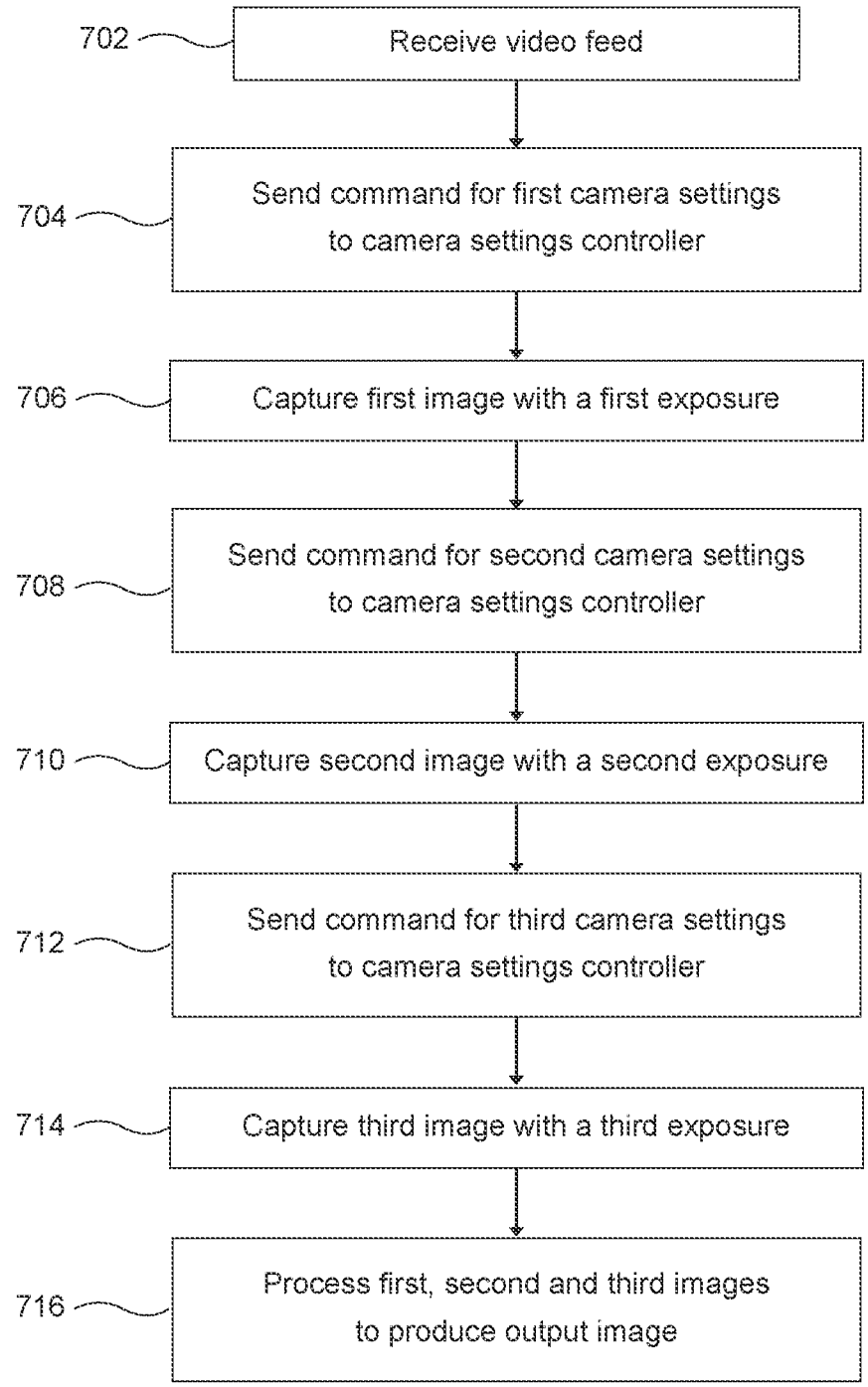
FIG. 7 is a schematic view of a process for capturing images with different exposures in a video feed, according to an embodiment.

FIG. 7 is a schematic view of a process for generating a sequence of images with alternating exposures. This process begins with receiving a video feed in step 702. Next, in step 704, system 202 could send a command to the camera controller to change the initial camera settings to a first set of camera settings. In some cases, the first set of camera settings could be a set of aperture, shutter-speed, and ISO settings intended to achieve a particular first exposure value. In other cases, the first set of camera settings could include an exposure compensation setting. Upon receiving the exposure compensation setting, the camera could automatically adjust the aperture, shutter-speed, and ISO settings to achieve an exposure value associated with the exposure compensation setting. In step 706, system 202 can receive, from the video feed, a first image taken while the camera is set to have the first exposure.

Next, in step 708, system 202 could send a command to the camera controller to change the camera settings from the first set of camera settings to a second set of camera settings. In some cases, the second set of camera settings could be a set of aperture, shutter-speed, and ISO settings intended to achieve a particular second exposure value. In other cases, the second set of camera settings could include an exposure compensation setting. Upon receiving the exposure compensation setting, the camera could automatically adjust the aperture, shutter-speed, and ISO settings to achieve an exposure value associated with the exposure compensation setting. In step 710, system 202 can receive, from the video feed, a second image taken while the camera is set to have the second exposure.

Next, in step 712, system 202 could send a command to the camera controller to change the camera settings from the second set of camera settings to a third set of camera settings. In some cases, the third set of camera settings could be a set of aperture, shutter-speed, and ISO settings intended to achieve a particular third exposure value. In other cases, the third set of camera settings could include an exposure compensation setting. Upon receiving the exposure compensation setting, the camera could automatically adjust the aperture, shutter-speed, and ISO settings to achieve an exposure value associated with the exposure compensation setting. In step 714, system 202 can receive, from the video feed, a third image taken while the camera is set to have the third exposure.

Finally, in step 716, system 202 could process the first, second, and third images to produce a single output image.

Figure 8:
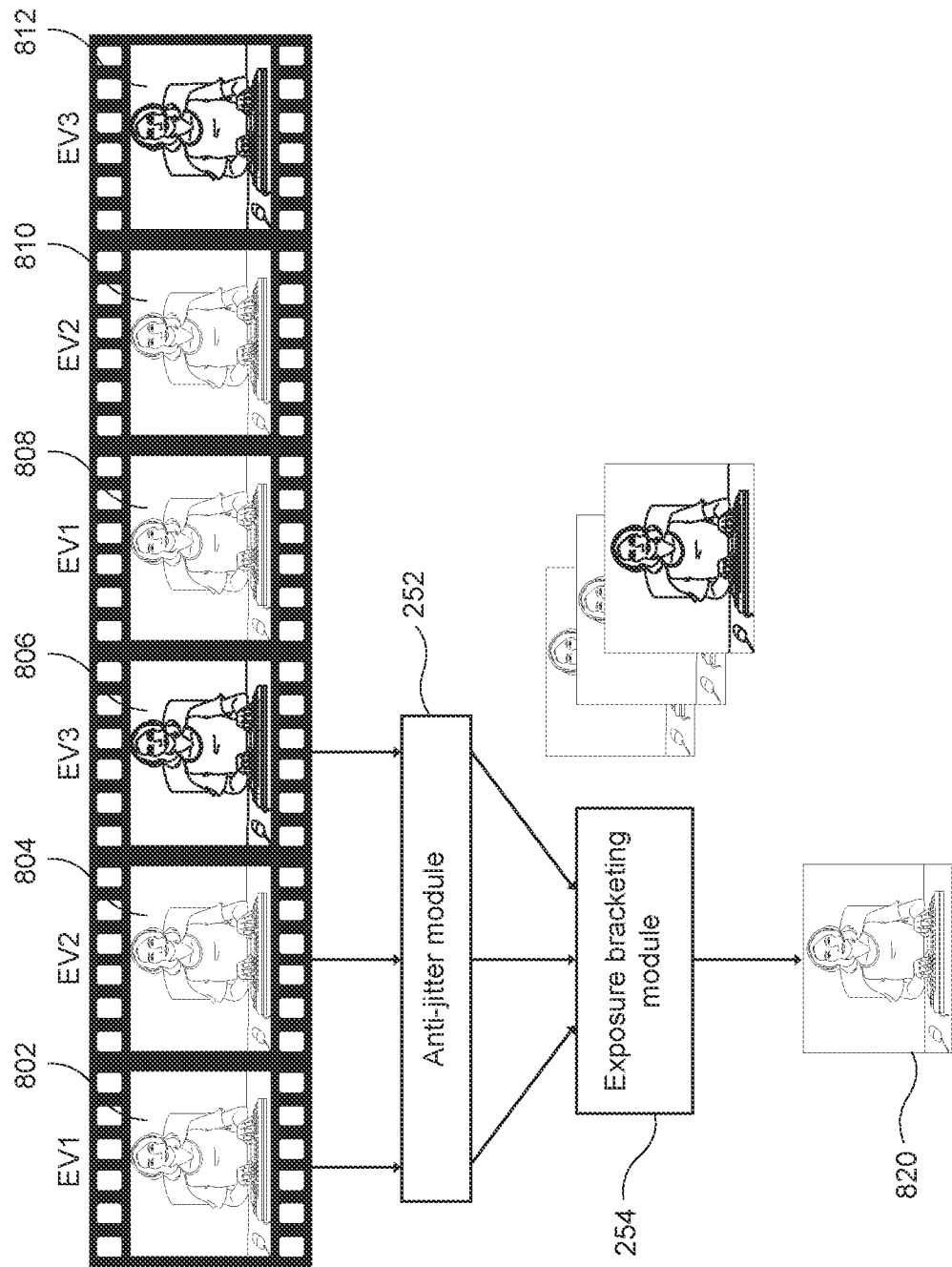
FIG. 8 is a schematic view of a process for merging a sequence of images to create a composite image, according to an embodiment.

FIG. 8 is a schematic view of a method of processing a first, second, and third image, each having a different exposure, to produce a single output image with a composite exposure. In this example, a camera has been set to alternate exposure values of each image (or frame). In this case, first image 802 has a first exposure value (EV1), second image 804 has a second exposure value (EV2), and third image 806 has a third exposure value (EV3). For purposes of illustration, the different EV values for each image are shown using different line weights. Moreover, this sequence of alternating exposures repeats with fourth image 808 has the same first exposure value as first image 802, fifth image 810 has the same second exposure value as second image 804, and sixth image 812 has the same third exposure value as third image 806.

The exemplary method processes three images at a time, each having a different exposure value. For example, in FIG. 8, first image 802, second image 804, and third image 806, each having a different exposure, are merged together. Each of first image 802, second image 804, and third image 806 are first processed by anti-jitter module 252. Using one or more anti-jitter algorithms, anti-jitter module 252 corrects for slight displacements in a user's body (and/or face) from one image (or frame) to the next, as a user moves. This ensures that the images can be combined at a later step without adding artifacts due to slight differences in the position of a user from one frame to the next. The resulting images from anti-jitter module 252 may be referred to as position-corrected or motion-corrected images.

The motion-corrected images from anti-jitter module 252 may be passed to exposure bracketing module 254. Exposure bracketing module 252 uses one or more imaging processing techniques to combine the three motion corrected images in order to generate a single output image 820.

The resulting output image 820 has a composite exposure that combines the exposures of the input images to create an optimally exposed image. Put another way, the exposures of output image 820 may be considered as a function of the three different exposures of first image 802, second image 804, and third image 806.

Although FIG. 8 depicts processing only the first three images, it may be appreciated that similar processing may be performed on each subsequent set of three images. For example, after processing first image 802, second image 804, and third image 806 to generate output image 820, the next triplet of images (fourth image 808, fifth image 810, and sixth image 812) can be processed to generate another output image.

Figure 9:
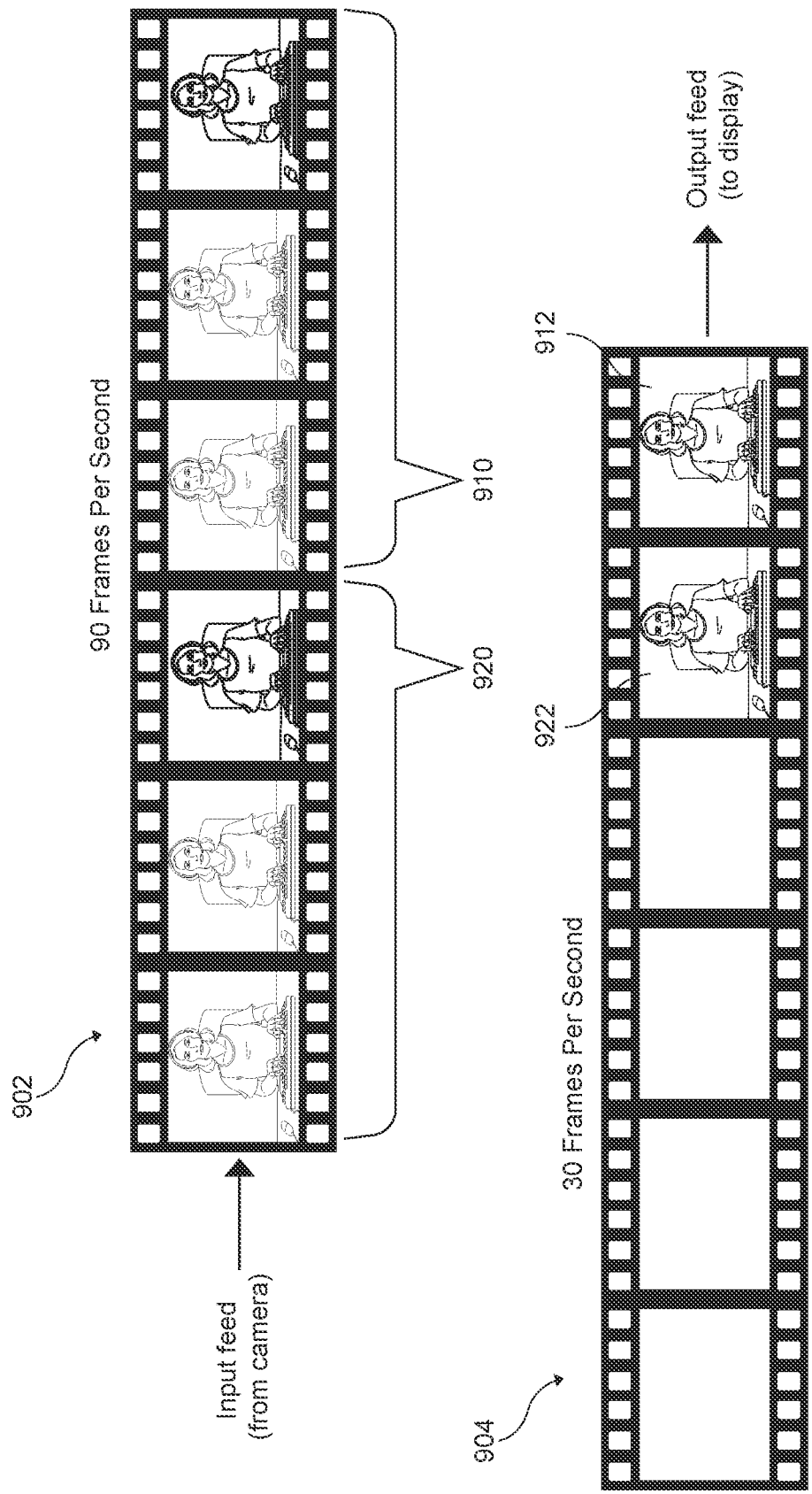
FIG. 9 is a schematic view of the relationship between images in an input video feed and images in an output video feed, according to an embodiment.

FIG. 9 shows a schematic view of a method of processing an input video feed with a first frame rate to generate an output video with a second frame rate that is less than the first frame rate. In this exemplary embodiment, the first frame rate is 90 frames per second, while the second frame rate is 30 frames per second.

First, images from input feed 902 are received at a processing system. The images have been captured using an alternating exposure, as described above. The images of the video feed may be grouped into sequences comprising three images, each having a different exposure from the other two images in the sequence. These sequences are then processed according to the method shown in FIG. 8. The result is a new composite image with an optimal exposure appended to output feed 904. For example, a first sequence of images 910 of input feed 902 are processed and merged to generate a first output image 912 of output feed 904. Following this, a second sequence of images 920 of input feed 902 are processed and merged to generate a second output image 922 of output feed 904. This process can be continued indefinitely as additional images (frames) are received with input feed 902, producing an output video feed that has a frame rate equal to one third of the frame rate of input feed 902.

For reference, the term "exposure sequence" refers to the order in which the exposure of images vary in a sequence of images (that is, in a video feed). For example, some exposure sequences could have a "saw-toothed" pattern, in which the value changes from a first value, rises to a second value, rises again to a third value, and then drops back to the first value as the sequence is repeated. An example of EV values in a saw-toothed exposure sequence is given in the example of FIG. 8, in which has an exposure sequence of: (EV1, EV2, EV3, EV1, EV2, EV3, and so on).

Figure 10:
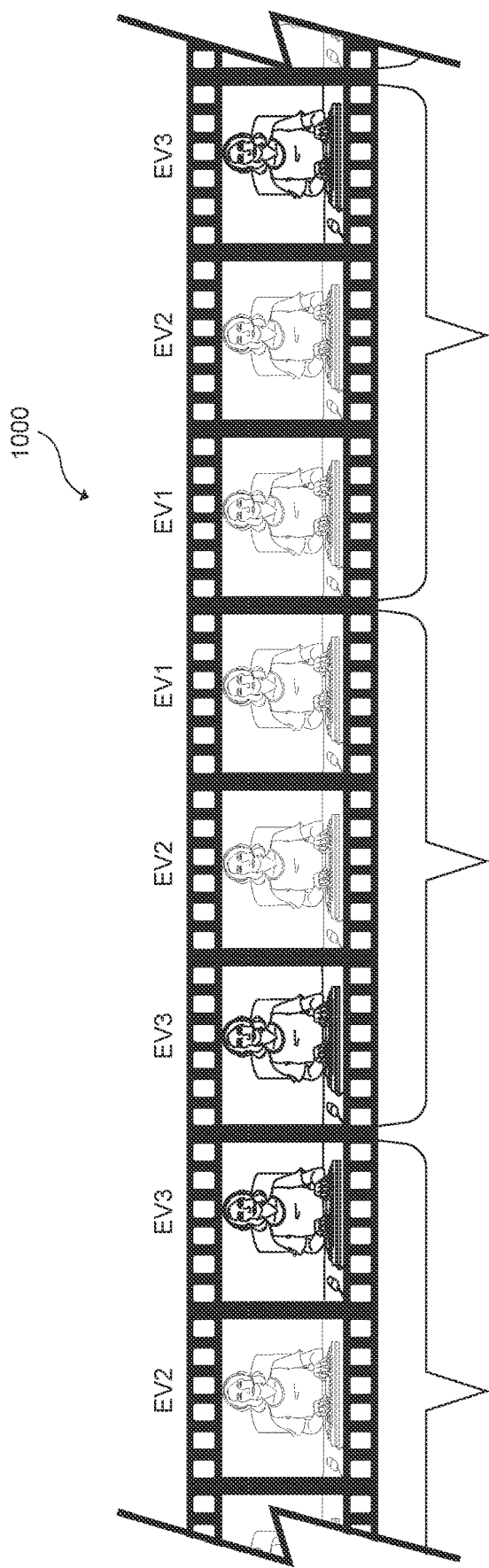
FIG. 10 is a schematic view of an alternative exposure pattern for an incoming video feed, according to an embodiment.

In some embodiments, it may be desirable to reduce the number of times the exposure is changed, since changing the exposure requires the camera to adjust one or more settings for aperture, shutter-speed, and ISO. To this end, FIG. 10 is an exemplary embodiment of an exposure sequence 1000 that minimizes how frequently the exposure is adjusted while still provided sequences of alternately exposed images. In this example, the exposure sequence is "S-shaped," as the exposure alternately captures back-to-back images with identical exposure settings at the maximum and minimum exposure settings. For example, the exposure sequence in FIG. 10 is given by: (EV1, EV2, EV3, EV3, EV2, EV1, EV1, EV2, EV3, EV3, EV2, and so on). Like the saw-toothed exposure sequence, the S-shaped exposure sequence provides sequences of three alternately exposed images that can be combined to generate a composite image with an optimal exposure as described above. However, using the S-shaped sequence may reduce processing time as well as mechanical lag time associated with changing one or more of the aperture, shutter-speed, and ISO settings.

The embodiments are not limited to use with a particular frame rate of video. As cameras and video applications increase processing power, higher frame rates may be more accessible for typical systems that are used for video calling. FIG. 11 shows an exemplary table of possible frame rates that could be used. In a first column, a normal, or default, camera frame rate is displayed. In a second column, a modified camera frame rate is displayed. In a third column, an output video frame rate is displayed. For example, in a first row, a camera may normally output 30 frames per second. Therefore, the system would automatically increase the frame rate by a factor of three, resulting in a modified camera frame rate of 90 frames per second. Because the exemplary exposure bracketing processes combine three input images to create a single output image, the output video frame rate is then reduced by a factor of three, resulting in the same 30 frames per second frame rate that is normally generated by the camera and which may be expected by a video application.

In FIG. 11, another embodiment could start with a 60 frames per second rate for a camera, increase the frame rate to 180, and then produce an output video with the original 60 frames per second. Likewise, in another embodiment, a process could start with a normal frame rate of 120 frames per second, increase the modified frame rate to 360 frames per second, and output a video feed with 120 frames per second.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of improving exposures of video feeds, the method comprising:
   receiving a video feed from a camera, wherein the camera is in communication with a camera settings controller, and wherein the camera settings controller can be used to adjust camera settings of the camera;
   sending a first command to the camera settings controller to adjust the camera settings to a first set of values associated with a first exposure;
   capturing a first image from the ongoing video feed while the camera settings have the first set of values;
   sending a second command to the camera settings controller to adjust the camera settings to a second set of values that is different than the first set of values, wherein the second set of values are associated with a second exposure that is different from the first exposure;

capturing a second image from the video feed while the camera settings have the second set of values;
sending a third command to the camera settings controller to adjust the camera settings to a third set of values that is different than the first set of values and that is different than the second set of values, wherein the third set of values are associated with a third exposure that is different from the first exposure and from the second exposure;
capturing a third image from the video feed while the camera settings have the third set of values;
processing, using an anti-jitter module, the first image to produce a first processed image;
processing, using the anti-jitter module, the second image to produce a second processed image;
processing, using the anti-jitter module, the third image to produce a third processed image;
processing, using an exposure bracketing module, the first image, the second image, and the third image, to produce a first output image;
wherein the first output image includes information from the first image, the second image, and the third image;
capturing a fourth image from the video feed while the camera settings have the third set of values;
sending a fourth command to the camera settings controller to adjust the camera settings to the second set of values associated with the second exposure;
capturing a fifth image from the video feed while the camera settings have the second set of values;
sending a fifth command to the camera settings controller to adjust the camera settings to the first set of values associated with the first exposure;
capturing a sixth image from the video feed while the camera settings have the first set of values;
processing, using the anti-jitter module, the fourth image to produce a fourth processed image;
processing, using the anti-jitter module, the fifth image to produce a fifth processed image;
processing using the anti-jitter module, the sixth image to produce a sixth processed image;
processing, using the exposure bracketing module, the fourth image, the fifth image, and the sixth image, to produce a second output image;
wherein the second output image includes information from the fourth image, the fifth image, and the sixth image; and
creating a modified video feed using at least the first output image and the second output image.

2. The method according to claim 1, wherein the camera settings include an aperture setting, and wherein each of the first set of values, the second set of values, and the third set of values include aperture values.

3. The method according to claim 1, wherein the camera settings include a shutter-speed setting, and wherein each of the first set of values, the second set of values, and the third set of values include shutter-speed values.

4. The method according to claim 1, wherein the camera settings include an ISO setting, and wherein each of the first set of values, the second set of values, and the third set of values include ISO values.

5. The method according to claim 1, wherein the camera settings include an exposure control setting, and wherein each of the first set of values, the second set of values, and the third set of values include exposure control values.

6. The method according to claim 1, the method further comprising sending the modified video feed to a video calling application.

7. A method of improving exposures of video feeds, the method comprising:
receiving a video feed having a first frame rate from a camera, wherein the camera is in communication with a camera settings controller, and wherein the camera settings controller can be used to adjust an exposure setting of the camera;
communicating with the camera settings controller to generate a first sequence images, wherein each of the images in the first sequence of images has a different exposure;
processing the first sequence of images to create a first output image comprising information from each image in the first sequence of images;
communicating with the camera settings controller to generate a second sequence of images, wherein each image in the second sequence of images has a different exposure;
processing the second sequence of images to create a second output image comprising information from each image in the second sequence of images; and
generating a modified video feed using the first output image and the second output image, wherein the modified video feed has a second frame rate that is less than the first frame rate.

8. The method according to claim 7, wherein the first sequence of images comprises three images and wherein the second sequence of images comprises three images.

9. The method according to claim 8, wherein the exposures of any two adjacent images in the video feed are different.

10. The method according to claim 8, wherein for at least some pairs of adjacent images in the video feed, the adjacent images have the same exposure.

11. The method according to claim 8, wherein:
the first sequence of images has a first image, a second image and a third image;
the second sequence of images has a fourth image, a fifth image, and a sixth image; and
wherein the first image, the second image, the third image, the fourth image, the fifth image, and the sixth image appear in the video feed in sequential order.

12. The method according to claim 11, wherein:
the first image has a first exposure, the second image has a second exposure, and the third image has a third exposure; and
wherein the fourth image has the first exposure, the fifth image has the second exposure, and the third image has the third exposure.

13. The method according to claim 11, wherein:
the first image has a first exposure, the second image has a second exposure, and the third image has a third exposure; and
wherein the fourth image has the third exposure, the fifth image has the second exposure, and the third image has the first exposure.

14. The method according to claim 7, wherein the exposures of the modified video feed vary in a saw-toothed pattern.

15. The method according to claim 7, wherein the exposures of the video feed vary in an S-shaped pattern.

16. A system for improving exposures of video feeds, the system comprising: a processor and machine-readable media including instructions which, when executed by the processor, cause the processor to:
receive a video feed having a first frame rate from a camera, wherein the camera is in communication with a camera settings controller, and wherein the camera settings controller can be used to adjust an exposure setting of the camera;

communicate with the camera settings controller to generate a first sequence images, wherein each of the images in the first sequence of images has a different exposure;

process the first sequence of images to create a first output image comprising information from each image in the first sequence of images;

communicate with the camera settings controller to generate a second sequence of images, wherein each image in the second sequence of images has a different exposure;

process the second sequence of images to create a second output image comprising information from each image of the second sequence of images; and create a modified video feed using the first output image and the second output image, wherein the modified video feed has a second frame rate that is less than the first frame rate.

17. The system according to claim 16, wherein the first frame rate is three times the second frame rate.

18. The system according to claim 16, wherein the camera settings controller is used to adjust an aperture setting of the camera.

19. The system according to claim 16, wherein the camera settings controller is used to adjust a shutter-speed setting of the camera.

20. The system according to claim 16, wherein the camera settings controller is used to adjust an ISO setting of the camera.

* * * * *